(12) United States Patent
Yan et al.

(10) Patent No.: US 9,632,759 B1
(45) Date of Patent: Apr. 25, 2017

(54) GENERATION OF AN INTERFACE FOR INTERACTION BETWEEN A MODELING ENVIRONMENT AND AN EXTERNAL SYSTEM

(71) Applicant: The MathWorks, Inc., Natick, MA (US)

(72) Inventors: Ying-On Yan, Lexington, MA (US); David Koh, Boston, MA (US); Jerome O. Chevalier, Westborough, MA (US); Tao Jia, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 50 days.

(21) Appl. No.: 14/638,614

(22) Filed: Mar. 4, 2015

Related U.S. Application Data

(63) Continuation-in-part of application No. 14/486,203, filed on Sep. 15, 2014, now abandoned, which is a continuation of application No. 12/625,000, filed on Nov. 24, 2009, now Pat. No. 8,839,187.

(60) Provisional application No. 61/153,183, filed on Feb. 17, 2009.

(51) Int. Cl.
*G06F 9/44* (2006.01)
*G06F 9/45* (2006.01)

(52) U.S. Cl.
CPC .................................. *G06F 8/423* (2013.01)

(58) Field of Classification Search
None
See application file for complete search history.

(56) References Cited

U.S. PATENT DOCUMENTS

| 8,839,187 | B1 | 9/2014 | Yan | |
| 2004/0148151 | A1* | 7/2004 | Menter | G06F 17/5045 717/135 |

OTHER PUBLICATIONS

Jarvi, "Configuring and Controlling External Hardware in MATLAB," http://www.mathworks.com/company/newsletters/articles/configuring-and-controlling-external-hardware-in-matlab.html, May 21, 2007, 6 pages.

* cited by examiner

Primary Examiner — Qamrun Nahar
(74) Attorney, Agent, or Firm — Harrity & Harrity, LLP

(57) ABSTRACT

A device may receive model information that describes a model and external system information that describes an external system that is different than the model. The model information may identify a first set of signals, associated with the model, that are incompatible with the external system. The external system information may identify a second set of signals, associated with the external system, that are incompatible with the model. The device may generate interface code based on the model information and the external system information. The interface code, when executed, may permit the model and the external system to interact using the first set of signals and the second set of signals. The device may execute the interface code to transform the first set of signals to the second set of signals and to transform the second set of signals to the first set of signals.

20 Claims, 16 Drawing Sheets

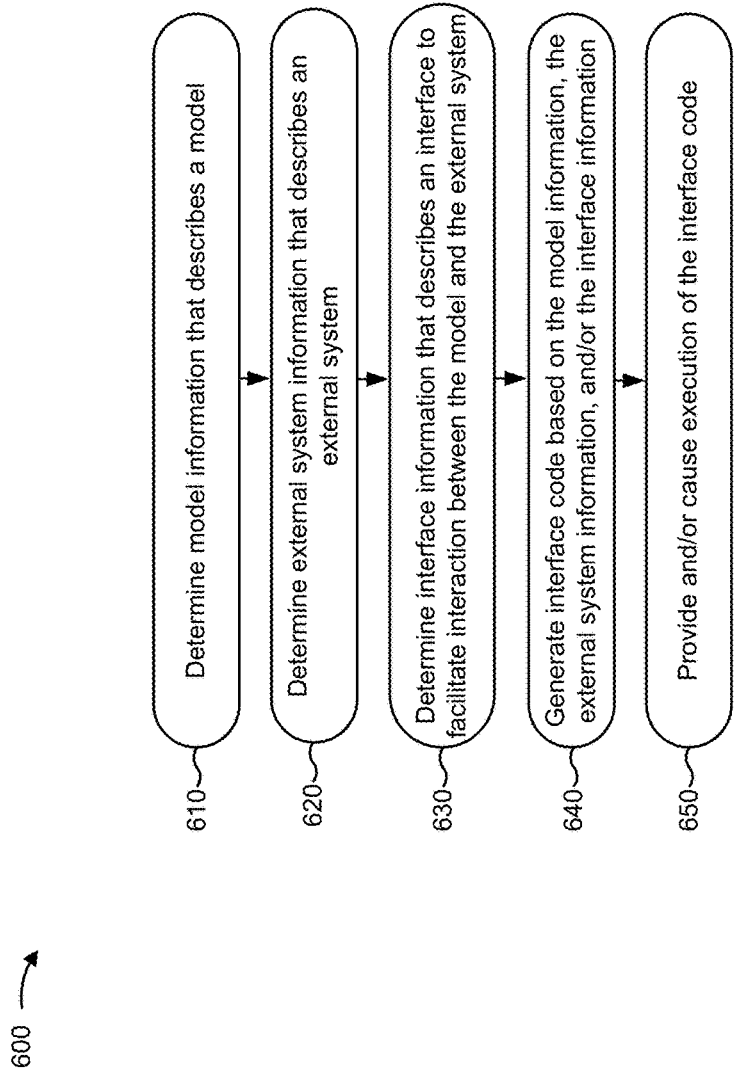

GENERATION OF AN INTERFACE FOR INTERACTION BETWEEN A MODELING ENVIRONMENT AND AN EXTERNAL SYSTEM

RELATED APPLICATION

This application claims priority from and is a continuation-in-part (CIP) of U.S. patent application Ser. No. 14/486,203, filed on Sep. 15, 2014, which is a continuation of U.S. patent application Ser. No. 12/625,000, filed on Nov. 24, 2009 (now U.S. Pat. No. 8,839,187 B1), which claims priority to U.S. Provisional Patent Application No. 61/153,183, filed on Feb. 17, 2009. The contents of these applications are incorporated by reference herein in their entireties.

BRIEF DESCRIPTION OF THE DRAWINGS

FIG. 6 is a flow chart of an example process for generating interface code to facilitate interaction between a model and an external system.

DETAILED DESCRIPTION

The following detailed description of example implementations refers to the accompanying drawings. The same reference numbers in different drawings may identify the same or similar elements.

A model may include a set of model elements that, when executed by a client device, simulates behavior of a system. The model may be designed in a modeling environment that is hosted by the client device. The model elements may cause the client device to interact with (e.g., provide signals to and/or receive signals from) an external system (e.g., another device in communication with the client device, an application hosted by the client device, an application hosted by the other device, or the like). However, interacting with the external system may be difficult for the client device. For example, the external system may provide and/or receive signals differently than the model (e.g., in a different format, via a different port or register, at a different data transmission rate, using a different data type, etc.). Thus, creating an interface to facilitate interaction between the client device and the model may be costly, time consuming, and error-prone.

Systems and/or methods, described herein, may enable the client device to generate an interface that facilitates interaction between the model and the external system. As described in more detail elsewhere herein, the client device may automatically generate the interface in a manner that reduces errors associated with the interface, conserves computing resources by generating efficient interface code for the interface (e.g., leading to faster execution of the interface code, more compact code, etc.), or the like. In some implementations, the client device may receive information that describes a model, an external system, and/or an interface. The information that describes the model, the external system, and/or the interface may be received in a format that enables efficient generation of the interface. The interface may facilitate interaction between the model and the external system by causing the client device and/or the external system to process signals into a format that facilitates the interaction. For example, a format compatible with the external system and the client device may be used for the signals. The client device may generate interface code based on the information that describes the interface. The client device may use the interface code to provide the interface between the model and the external system, or may transmit the interface code to the external system (e.g., for the external system to use to provide the interface between the model and the external system). In this way, the client device may efficiently generate interface code to facilitate interaction with an external system based on the information that describes the model, the external system, and/or the interface.

Figure 1A:
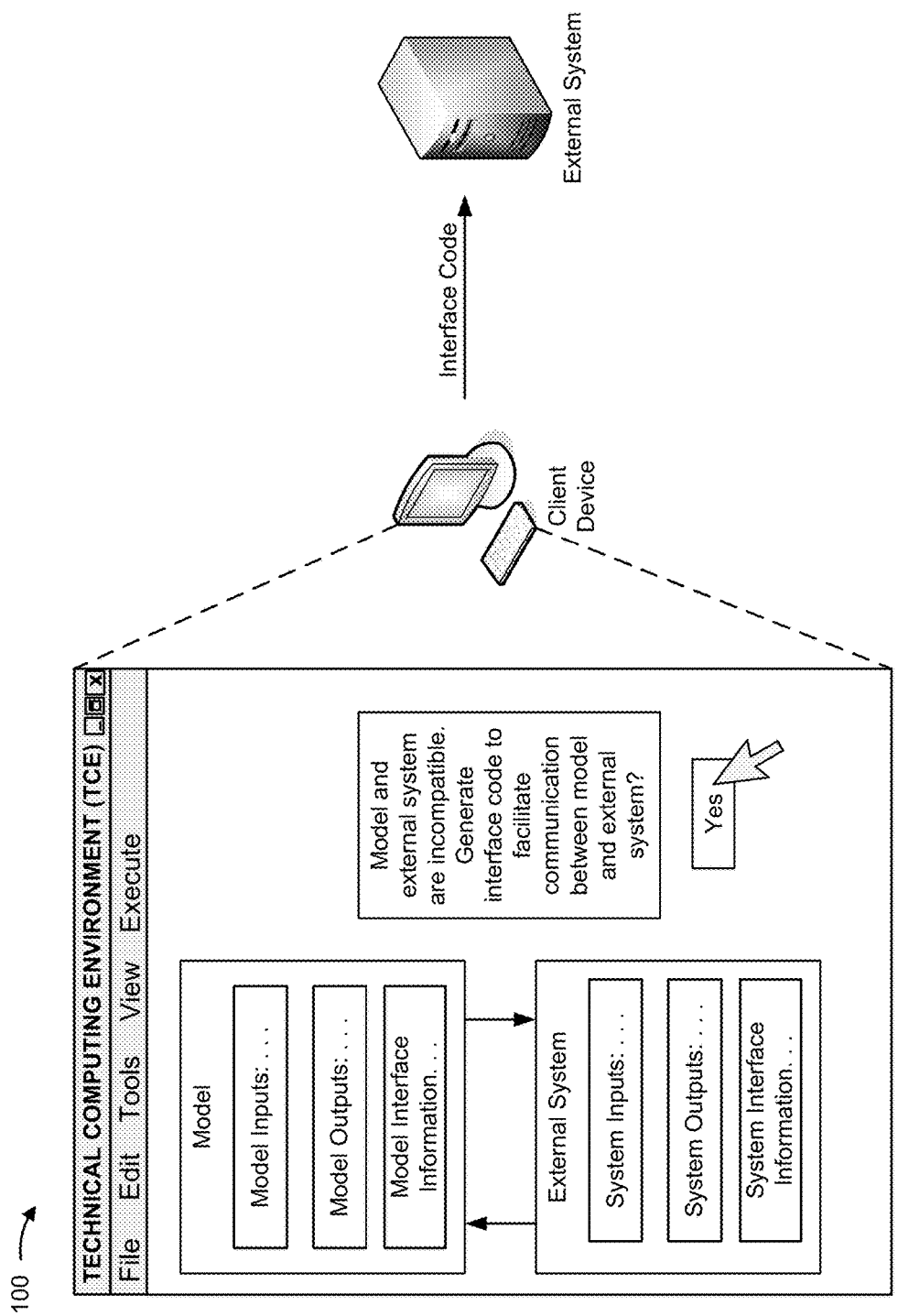
FIGS. 1A and 1B are diagrams of an overview of an example implementation described herein.
Figure 1B:
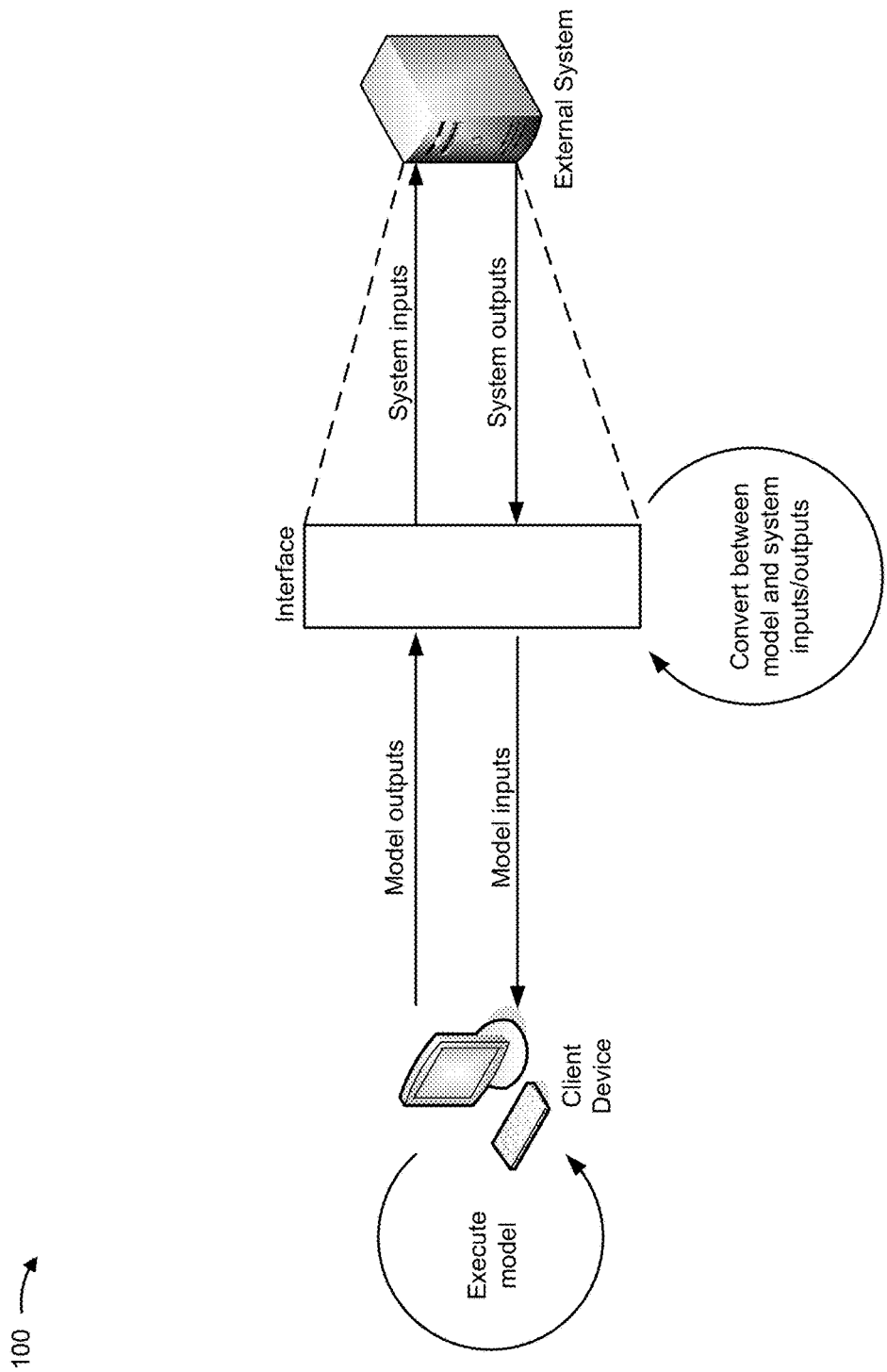

FIGS. 1A and 1B are diagrams of an overview of an example implementation 100 described herein. For the purpose of FIGS. 1A and 1B, assume that a client device provides a technical computing environment (TCE) that facilitates generation and execution of a model. As shown in FIG. 1A, assume that the client device (e.g., the TCE) receives information that identifies inputs, outputs, and interface information related to the model (e.g., shown as Model Inputs, Model Outputs, and Model Interface Information). Assume further that the client device receives information that identifies inputs, outputs, and interface information related to an external system (e.g., shown as System Inputs, System Outputs, and System Interface Information). As shown, the client device may determine that the model and the external system cannot successfully interact, based on a difference (e.g., in format, mapping, data transmission rate, etc.) between the inputs and outputs of the model and the external system.

As further shown, the client device may generate interface code to facilitate interaction between the model and the external system. Assume that the client device generates the interface code based on detecting the difference between the inputs and outputs of the model and the external system, and based on the information that identifies the inputs, outputs, and interface information. As shown, assume that the client device provides the interface code to the external system. Assume further that the interface code, when executed by the external system, causes the external system to provide the interface.

As shown in FIG. 1B, assume that the external system executes the interface code to provide the interface. Assume further that the client device executes the model to generate model outputs. As shown, assume that the client device provides the model outputs to the external system. Assume further that the interface provided by the external system processes the model outputs to generate system inputs. As shown, the external system may provide, to the client device, system outputs (e.g., based on the system inputs, based on actions internal to the external system, or the like). Assume that the interface provided by the external system processes the system outputs to generate model inputs, and provides the model inputs to the client device for execution by the model.

In this way, a client device may efficiently generate an interface to facilitate interaction between a model and an external system. The model may interact with the external system via the interface and/or may simulate a component of the external system. By interacting with and/or simulating the component of the external system, the model may improve understanding of performance of the external system (e.g., by testing the component of the external system, by analyzing system outputs, by testing a cycle of the system, or the like).

Figure 2:
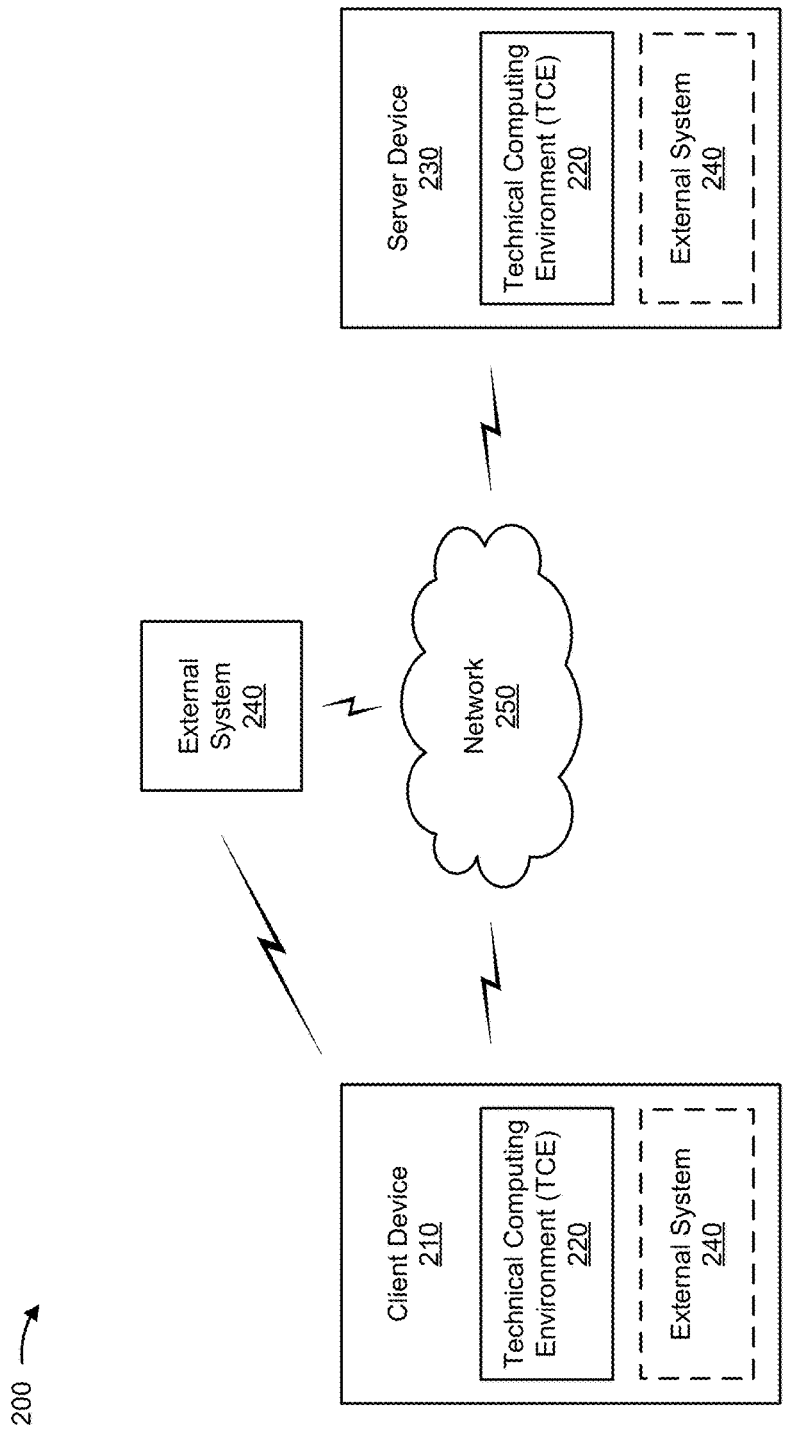
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220, a server device 230, an external system 240, and a network 250. As further shown, TCE 220 may be included in client device 210 and/or server device 230. As further shown, external system 240 may be included in client device 210 and/or server device 230, and/or may be separate from client device 210 and/or server device 230. Devices of environment 200 may interconnect via wired connections, wireless connections, or a combination of wired and wireless connections.

Client device 210 may include one or more devices capable of receiving, generating, storing, processing, and/or providing a modeling environment (e.g., TCE 220) and/or information related to the modeling environment. For example, client device 210 may include a computing device, such as a desktop computer, a laptop computer, a tablet computer, a mobile phone (e.g., a smart phone, a radiotelephone, etc.), or a similar device. Client device 210 may provide an interface to facilitate interaction between a model, associated with TCE 220, and external system 240. In some implementations, client device 210 may receive information from and/or transmit information to server device 230 and/or external system 240 (e.g., based on an interface). For example, the model and external system 240 may communicate via a network, via an application programming interface (API), via hardware memory map, via a data stream, via a hardware stream, via a graphical map, via a software map, or the like.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may be integrated with or operate in conjunction with a graphical modeling environment, which may provide graphical tools for constructing a model. TCE 220 may include additional tools, such as tools designed to convert a model into an alternate representation, such as program code, source computer code, compiled computer code, and/or a hardware description (e.g., a description of a circuit layout). In some implementations, TCE 220 may provide this ability using graphical toolboxes (e.g., toolboxes for signal processing, image processing, color manipulation, data plotting, parallel processing, etc.). In some implementations, TCE 220 may provide these functions as block sets. In some implementations, TCE 220 may provide these functions in another way.

A model generated using TCE 220 may include, for example, any equations, assignments, constraints, computations, algorithms, and/or process flows. The model may be implemented as, for example, time-based block diagrams (e.g., via the Simulink software), discrete-event based diagrams (e.g., via the SimEvents software), dataflow diagrams, state transition diagrams (e.g., via the Stateflow software), software diagrams, a textual array-based and/or dynamically typed language (e.g., via the MATLAB software), a list or tree, and/or another form. A model generated using TCE 220 may include, for example, a model of a physical system, a computing system, an engineered system, an embedded system, a biological system, a chemical system, etc.

A model element in the model may include, for example, a function in a TCE environment (e.g., a MATLAB function), an object in a TCE environment (e.g., a MATLAB system object), a block in a graphically-based environment (e.g., a Simulink block, a LabView block, an Agilent VEE block, an Agilent ADS block, an Agilent Ptolemy block, etc.), or the like.

A model may provide a signal to and/or receive a signal from external system 240, and/or may cause client device 210 to provide a signal to and/or receive a signal from external system 240. For example, client device 210 may host TCE 220 that provides the model, and may host external system 240. Additionally, or alternatively, external system 240 may be hosted by a device other than client device 210, and the model, when executed by client device 210, may cause client device 210 to provide a signal to and/or receive a signal from external system 240.

TCE 220 may schedule and/or execute a model using one or more computational resources, such as one or more central processing units (CPUs) or cores, one or more field programmable gate arrays (FPGAs), one or more graphics processing units (GPUs), and/or other elements that can be used for computation. TCE 220 may include a compiler that may be used to schedule the model elements of the model, allocate hardware resources, such as memory and CPUs, to the model elements and to the connections that interconnect the model elements, or the like.

Server device 230 may include one or more devices capable of receiving, generating, storing, processing, and/or providing program code and/or information related to program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel), and may provide respective results of executing the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution). Additionally, or alternatively, server device 230 may perform one, more, or all operations described elsewhere herein as being performed by client device 210.

External system 240 may include one or more devices capable of receiving signals from and/or providing signals to a model (e.g., via client device 210). In some implementations, external system 240 may include an analog device, a digital device, and/or a combination analog/digital device. External system 240 may interact with a model (e.g., a model hosted by client device 210). External system 240 may execute code that causes external system 240 to provide a model function and/or an interface (e.g., to allow the model function to interact with external system 240).

In some implementations, external system 240 may include a system and/or subsystem, such as a server, a desktop computer, a laptop computer, a tablet computer, a mobile phone (e.g., a smart phone), a camera, a camcorder, a microphone, a video display, a robot, or the like. Additionally, or alternatively, external system 240 may include a component of a system and/or subsystem, such as a sensor, an actuator, a motor, an accelerometer, a gyroscope, a measurement device, an input component, an output component, a processing component, a video processor, a transmitter, or the like. External system 240 may include a combination of a system, a subsystem, and/or a component, in some implementations. External system 240 may communicate with client device 210 using wired and/or wireless connections to exchange signals. In some implementations, external system 240 may be a hardware system (e.g., a hardware system that is separate from or a part of client device 210 and/or server device 230). Additionally, or alternatively, external system 240 may be a software system (e.g., an application executing on a device, such as client device 210, server device 230, or another device).

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
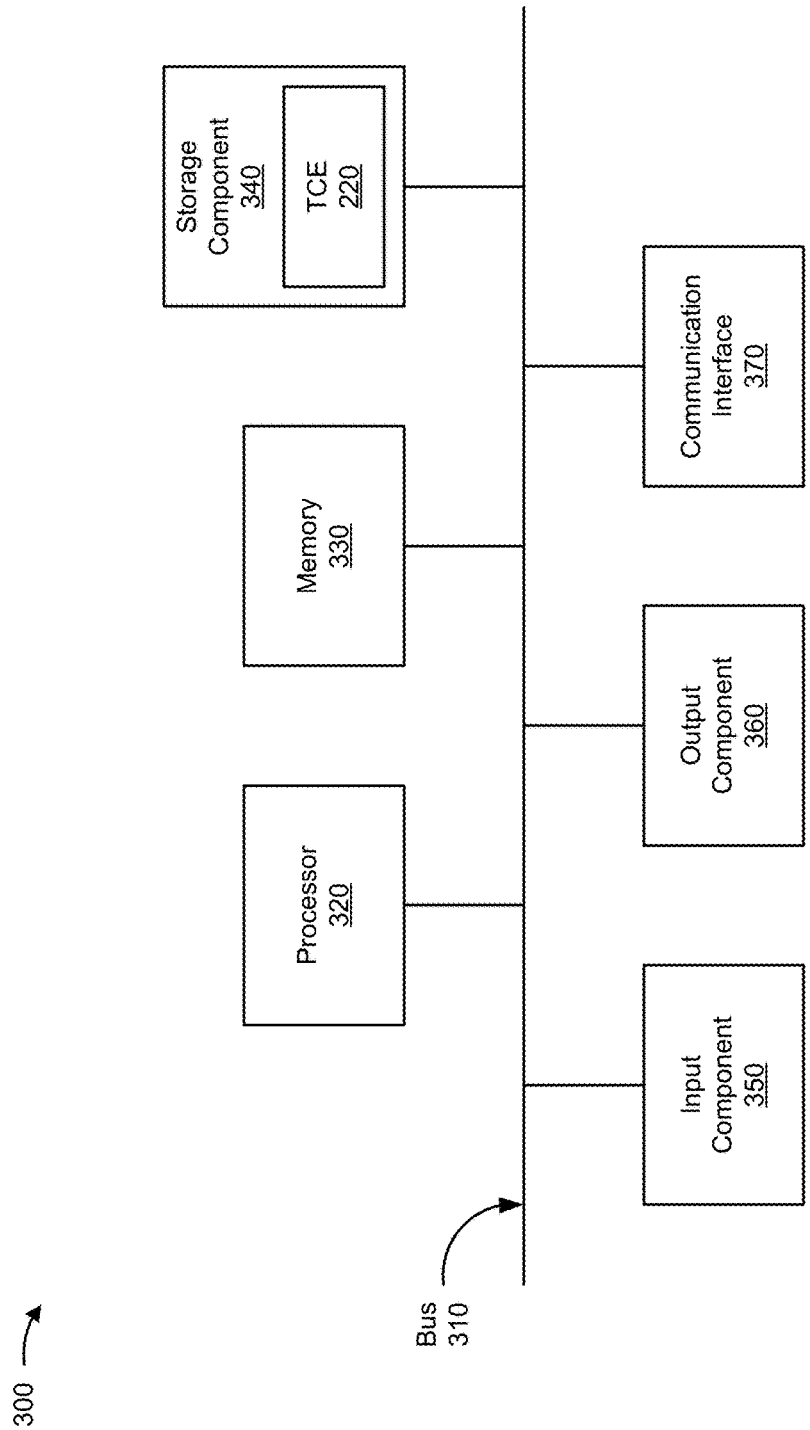
FIG. 3 is a diagram of example components of one or more devices of FIG. 2.

FIG. 3 is a diagram of example components of a device 300. Device 300 may correspond to client device 210, server device 230, and/or external system 240. In some implementations, client device 210, server device 230 and/or external system 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4F are diagrams of an example implementation 400 of generating interface code to facilitate interaction between a model and an external system. For the purpose of FIGS. 4A-4F, assume that external system 240 is a different device than client device 210. Assume further that client device 210 and external system 240 are in communication (e.g., based on a wired connection, a wireless connection, or another type of connection).

Figure 4A:
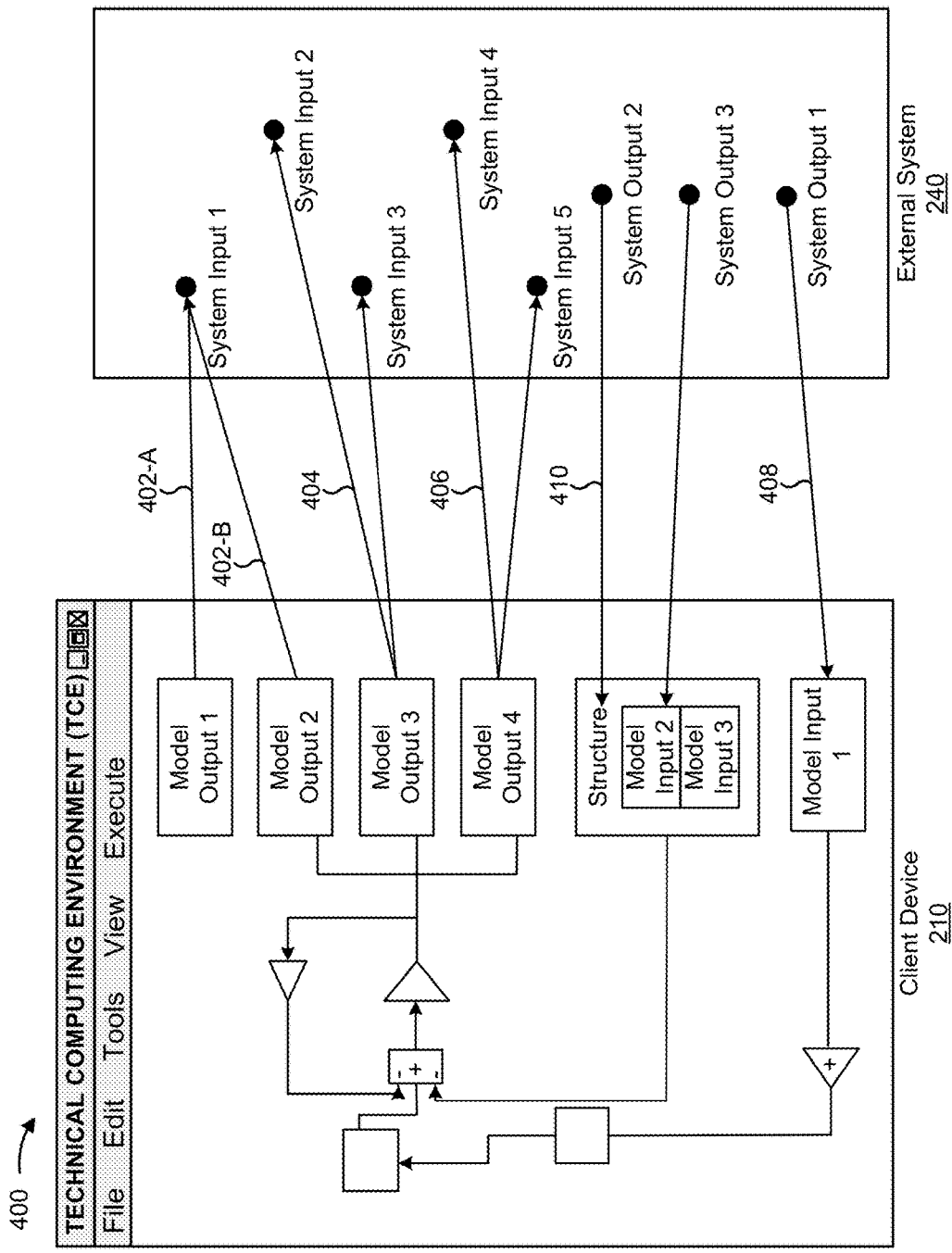
FIGS. 4A-4F are diagrams of an example implementation of generating interface code to facilitate interaction between a model and an external system.

For the purpose of FIG. 4A, assume that a model, that is hosted by client device 210, provides signals to and receives signals from external system 240. As shown in FIG. 4A, and by reference numbers 402-A and 402-B, the model may provide a first model output (Model Output 1) and a second model output (Model Output 2), and external system 240 may receive the first model output and the second model output as a first system input (e.g., System Input 1 that combines Model Output 1 and Model Output 2). As shown by reference number 404, the model may provide a third model output (Model Output 3), which external system 240 may receive as a second system input and a third system input (e.g., the Model Output 3 may be duplicated, divided, etc. to generate System Input 2 and System Input 3). As shown by reference number 406, the model may provide a fourth model output (Model Output 4), which external system 240 may receive as a fourth system input (System Input 4) and a fifth system input (System Input 5).

As shown by reference number 408, external system 240 may provide a first system output (System Output 1), which the model may receive as a first model input (Model Input 1). As shown by reference number 410, external system 240 may provide a second system output (System Output 2) and a third system output (System Output 3), and the model may receive the second and third system outputs as a second model input (e.g., Model Input 2, shown as a data structure that includes the System Output 2 and System Output 3).

Assume that one or more signals provided from the model to external system 240 and/or from external system 240 to the model are incompatible at the receiving system (e.g., the model or external system 240). For example, a particular signal in native form may be incompatible when the particular signal is output at a different data transmission rate, using a different data precision, using a different data type, using a different format, or the like, than the model or external system 240 is capable of using. As another example, the model may output a signal as a digital signal, but external system 240 may be an analog device and may require an analog signal as input. In other words, a signal output from a model in native form may be incompatible as an input for external system 240 when external system 240 cannot use the signal in the signal's native form (e.g., a form of the signal as the signal is output from the model). For example, a model may output a digital signal whereas an external system may only be compatible with analog signals. In this situation, the model output, in native form, is incompatible with the external system. Furthermore, in this situation, the model output may need to be transformed in order to make the model output compatible with the external system. In some implementations, an interface may be used to make incompatible signals compatible. For example, an interface may transform the model output from a native form to a form compatible with the external system (e.g., by transforming a digital signal into an analog signal).

Likewise, a signal output from external system 240 may be incompatible, in native form, as an input to the model when the model cannot use the signal without a transformation of the signal (e.g., by an interface). As described in more detail elsewhere herein, the transformation may be a transformation of a format of the signal, a rate of the signal, a data precision of the signal, a mapping of the signal, or the like. Client device 210 may generate an interface to convert signals into compatible formats, as described in more detail below.

Figure 4B:
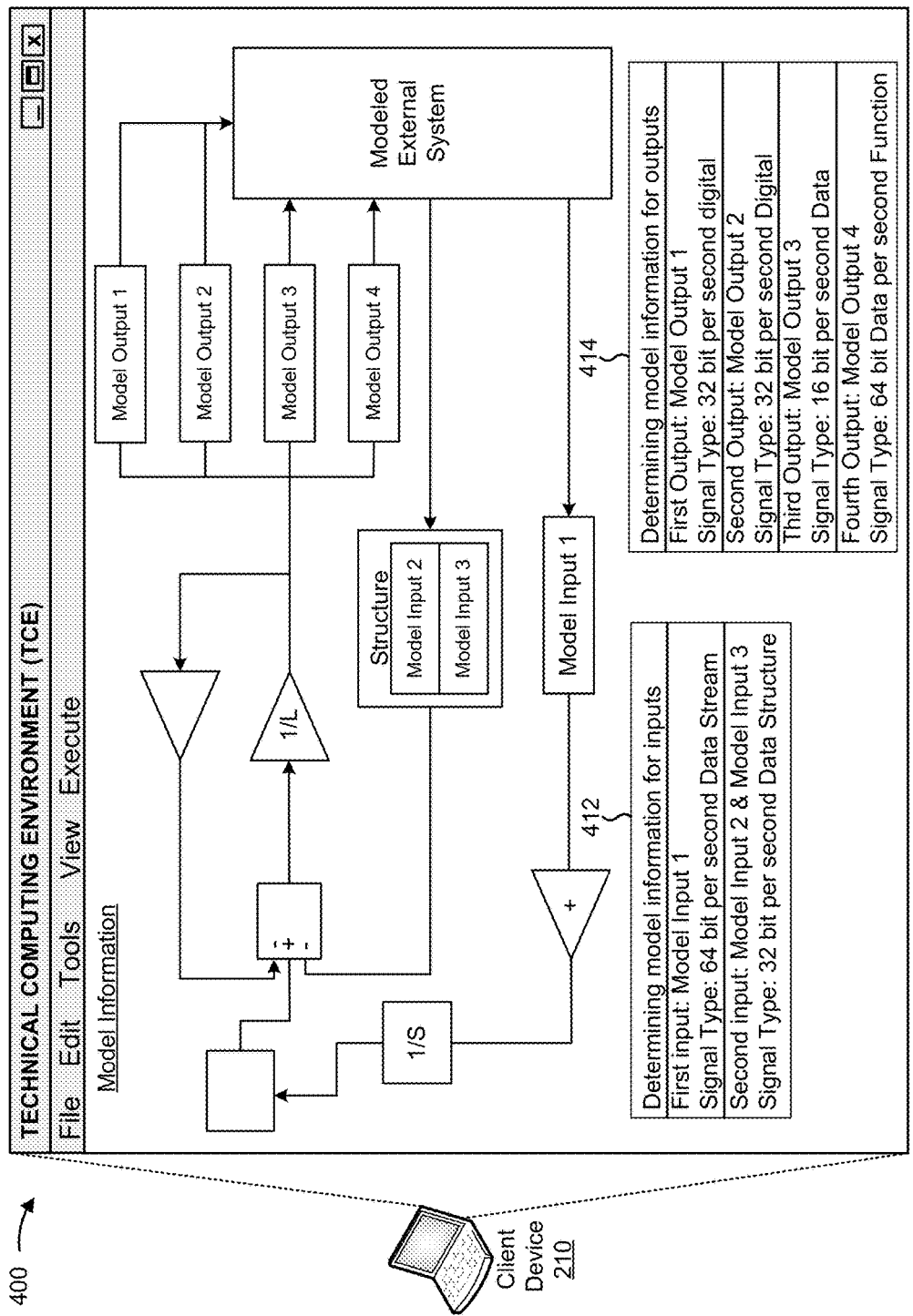

For the purpose of FIG. 4B, assume that client device 210 determines model information by automatically detecting the model information of a model associated with TCE 220. As shown, assume that the model includes a representation of external system 240, and a manner in which external system 240 interacts with the model (e.g., model outputs provided as system inputs to external system 240, system outputs provided as model inputs to the model, etc.). In some implementations, client device 210 may determine the model information based on a user interaction, based on an external source, or the like. As shown in FIG. 4B, and by reference number 412, client device 210 may determine model information that describes one or more inputs. As shown, client device 210 may determine that Model Input 1 receives a 64 bit per second data stream signal (e.g., a stream of packets associated with a data rate of 64 bits per second). As further shown, client device 210 may determine that Model Input 2 and Model Input 3 receive a 32 bit per second data structure signal (e.g., a data structure, associated with a data rate of 64 bits per second, that includes information received via Model Input 2 and Model Input 3).

As shown by reference number 414, client device 210 may determine model information that describes one or more outputs. As further shown, client device 210 may determine that Model Output 1 and Model Output 2 are 32 bit per second digital signals (e.g., that Model Output 1 and Model Output 2 output discrete digital signals, as opposed to continuous analog signals). As further shown, client device 210 may determine that Model Output 3 is a 16 bit per second data signal (e.g., that Model Output 2 outputs a signal that includes data with a data rate of 16 bits per second). As further shown, client device 210 may determine that Model Output 4 is a 64 bit per second data function signal (e.g., that Model Output 3 outputs a signal that includes data with a data rate of 64 bits per second and is associated with a callback function performed by external system 240). Assume that client device 210 stores the model information.

Figure 4C:
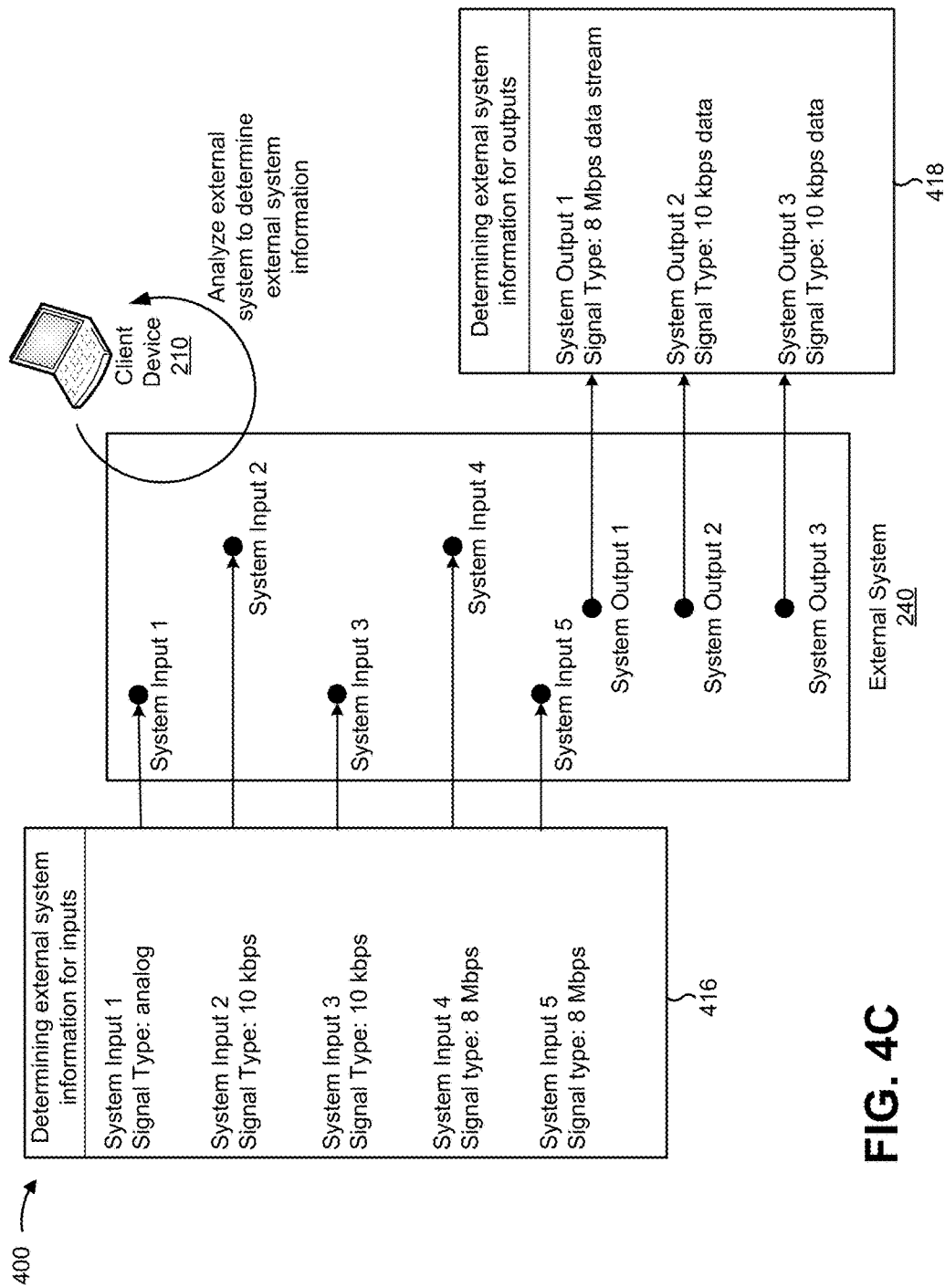

As shown in FIG. 4C, client device 210 may analyze external system to 240 determine external system information that describes external system 240. As shown by reference number 416, client device 210 may determine external system information that describes inputs of external system 240. As shown, client device 210 may determine that System Input 1 receives an analog signal (e.g., a continuous analog signal, as compared to Model Output 1, which provides a discrete digital signal). As further shown, client device 210 may determine that System Input 2 and System Input 3 receive 10 kilobit per second data signals. As shown, client device 210 may determine that System Input 4 and System Input 5 receive 8 megabit per second data signals.

As further shown in FIG. 4C, and by reference number 418, client device 210 may determine external system information that describes outputs of external system 240. As shown, client device 210 may determine that System Output 1 provides an 8 megabit per second data stream signal. As further shown, client device 210 may determine that System Output 2 and System Output 3 provide 10 kilobit per second data signals.

Figure 4D:
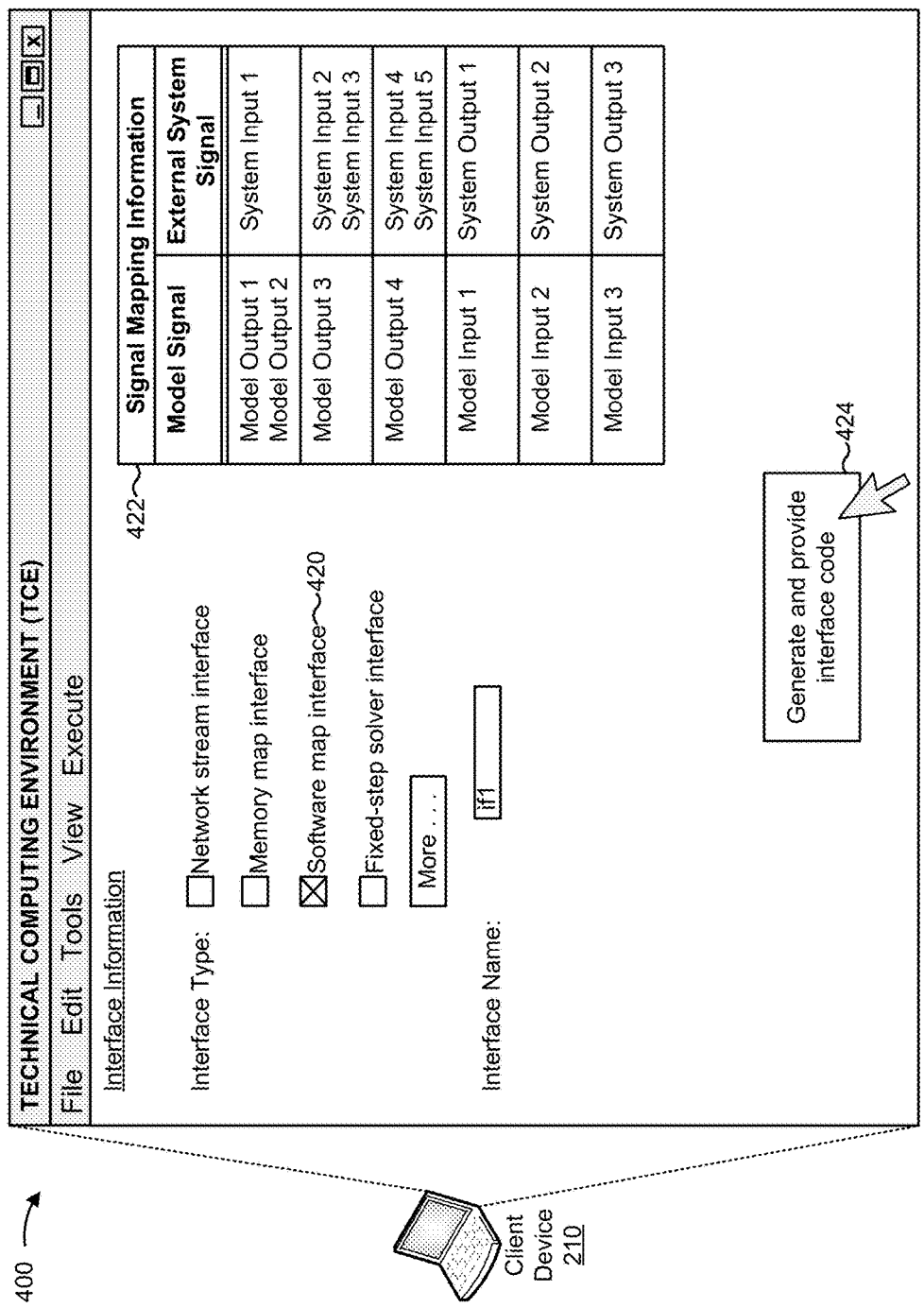

As shown in FIG. 4D, client device 210 may determine interface information. Here, assume that client device 210 determines the interface information based on user input. In some implementations, client device 210 may determine the interface information automatically without user input (e.g., based on a type of external system 240, based on information associated with signals, based on an external source that describes the interface information, or the like). As shown by reference number 420, client device 210 may determine whether the interface is a software map interface, a network stream interface, a memory map interface, a fixed-step solver interface, or another type of interface. In some implementations, a software map interface may refer to an interface that maps particular inputs and outputs of a software program, a network stream interface may refer to an interface that processes network stream information between network devices, a memory map interface may refer to an interface that maps particular memory addresses to other memory addresses, and a fixed-step solver interface may refer to an interface that converts a signal to facilitate performance of a fixed-step solver analysis. For the purpose of FIG. 4D, assume that the interface is a software map interface, as shown.

As shown by reference number 422, client device 210 may determine signal mapping information that associates inputs and/or outputs of the model and/or of external system 240. As shown, client device 210 may associate Model Output 1 and Model Output 2 with System Input 1, may associate Model Output 3 with System Input 2 and System Input 3, and may associate Model Output 4 with System Input 4 and System Input 5. As further shown, client device 210 may associate Model Input 1 and System Output 1, may associate Model Input 2 and System Output 2, and may associate Model Input 3 and System Output 3. In some implementations, the model inputs and system outputs may be associated automatically without user input (e.g., based on the model information and/or the external system information, based on a type of signal, etc.). As shown by reference number 424, assume that the user interacts with an input mechanism provided via TCE 220 to cause client device 210 to generate and/or provide interface code.

Figure 4E:
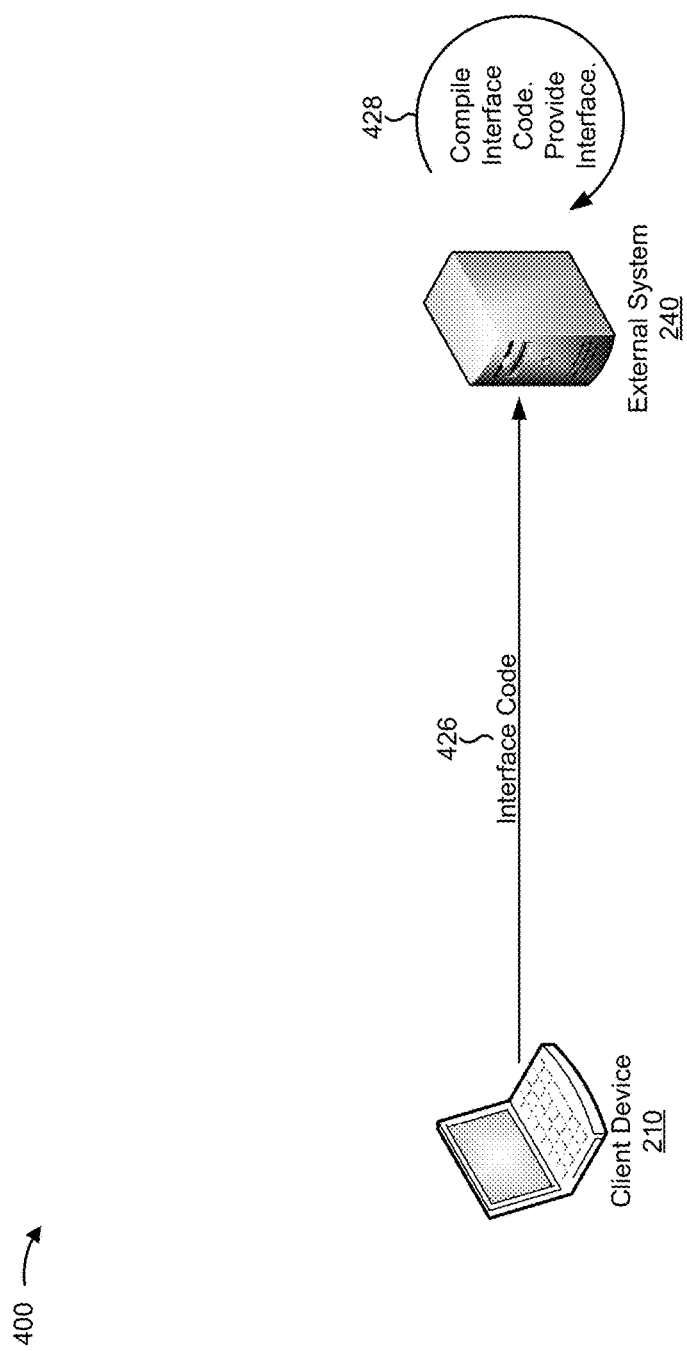

As shown in FIG. 4E, and by reference number 426, client device 210 may provide the interface code to external system 240. As shown by reference number 428, external system 240 may compile the interface code in order to execute the interface code (e.g., locally). Assume that external system 240 executes the interface code after compiling the interface code. In some implementations, external system 240 may execute the interface code without compiling the interface code (e.g., the interface code may be interpreted code that may not need to be compiled). As further shown, external system 240 may provide an interface based on the interface code. In some implementations, client device 210 may execute the interface code and provide the interface.

Figure 4F:
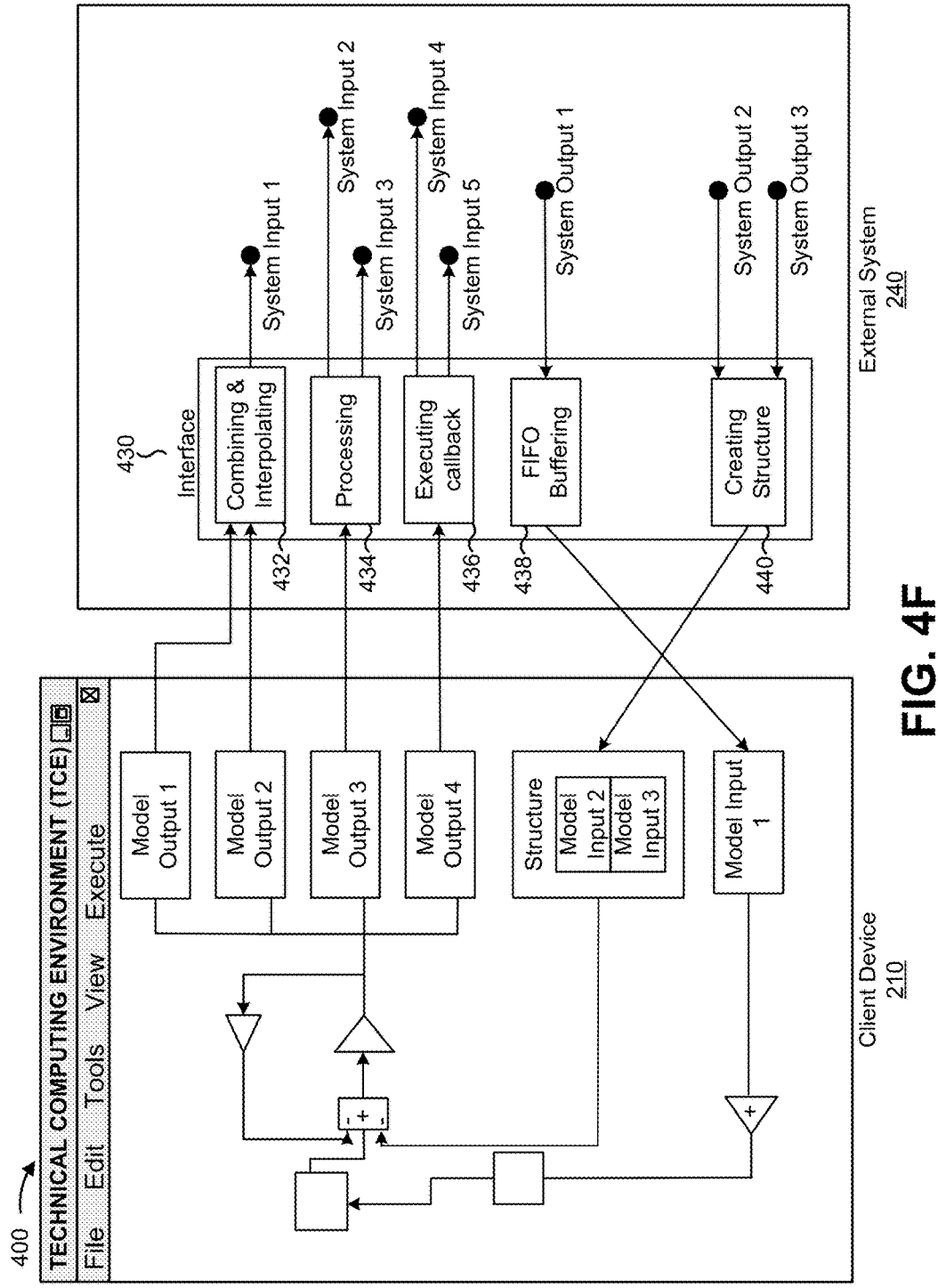

As shown in FIG. 4F, and by reference number 430, external system 240 may provide the interface to facilitate interaction between the model and external system 240. As further shown, the interface may convert signals provided by the model to external system 240 and/or by external system 240 to the model. As shown by reference number 432, external system 240 may convert signals associated with Model Output 1 and Model Output 2 by combining the signals and by performing interpolation on a combined signal (e.g., to convert the combined signal from a discrete digital signal to a continuous analog signal). As shown by reference number 434, external system 240 may process a signal associated with Model Output 3 (e.g., by splitting, duplicating, etc. the signal, and by providing split or duplicated signals to System Input 2 and System Input 3). As shown by reference number 436, external system 240 may perform a callback function on a signal associated with Model Output 4 (e.g., external system 240 may execute a segment of code provided within the signal in order to process the signal for System Input 4 and System Input 5).

As shown by reference number 438, external system 240 may convert a signal associated with System Output 1 by performing First-In First-Out (FIFO) buffering (e.g., based on the signal including a stream of packets). As shown by reference number 440, external system 240 may convert signals associated with System Output 2 and System Output 3 by creating a data structure based on the signals (e.g., by concatenating data included in the signals, or the like).

In this way, client device 210 may efficiently generate and/or provide interface code to generate an interface that facilitates interaction between a model and external system 240. Client device 210 may generate the interface code based on model information, external system information, and/or interface information. The interface code may be provided to and executed by external device 240, or may be executed locally by client device 210. By processing signals between the model and external system 240, the interface facilitates interaction between the model and external system 240.

As indicated above, FIGS. 4A-4F are provided merely as an example. Other examples are possible and may differ from what was described with regard to FIGS. 4A-4F.

FIGS. 5A-5E are diagrams of an example implementation 500 of an interface 505, and example adapters of the interface, for adapting signals with different characteristics to facilitate interaction between a model and an external system. As shown, interface 505 may include a format adapter 510, a rate adapter 515, a data precision adapter 520, and a mapping adapter 525. One or more of these adapters may be used to convert a model signal, with model-compatible characteristics compatible with TCE 220, to a system signal with system-compatible characteristics compatible with external system 240.

As an example, a modeled function 530 may receive inputs or provide outputs having one or more first characteristics that are compatible with TCE 220 (e.g., modeled function 530), but that are not compatible with external system 240 (e.g., are not compatible with a port 535 of external system 240). As another example, port 535 may receive inputs or provide outputs having one or more second characteristics that are compatible with external system 240 (e.g., port 535), but that are not compatible with TCE 220 (e.g., modeled function 530). As shown by reference number 540, one or more inputs, one or more outputs, and/or one or more messages (e.g., command messages, status messages, etc.) may be processed by one or more rate adapters to interface signals between a model (e.g., a modeled function) and external system 240. Format adapter 510, rate adapter 515, data precision adapter 520, and mapping adapter 525 are described in more detail in connection with FIGS. 5B-5E.

Figure 5A:
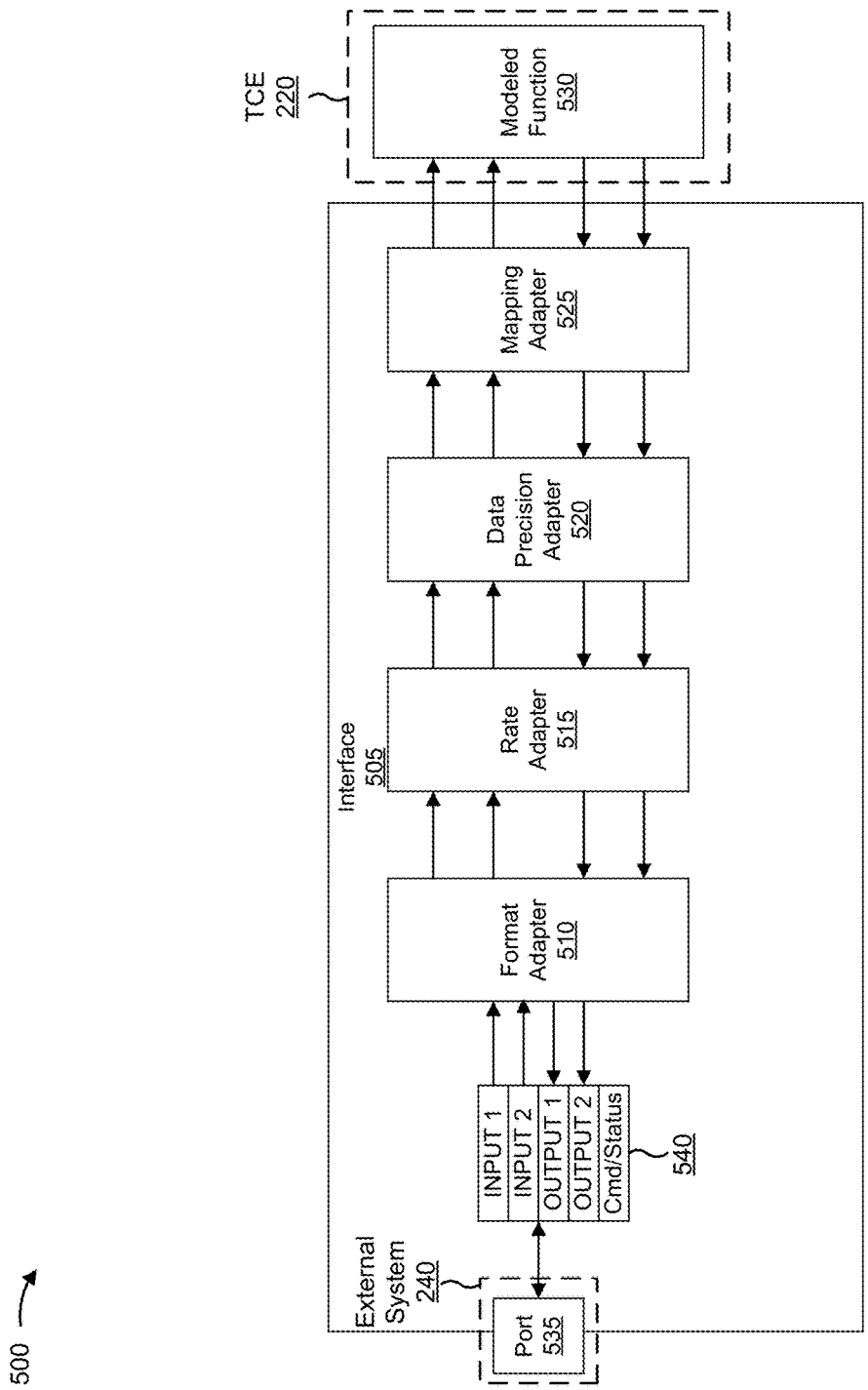
FIGS. 5A-5E are diagrams of an example implementation of an interface, and example adapters of the interface, for adapting signals with different characteristics to facilitate interaction between a model and an external system.

The adapters shown in FIG. 5A are provided as an example. In some implementations, interface 505 may include additional adapters, fewer adapters, different adapters, or differently arranged adapters than those shown in FIG. 5A.

Figure 5B:
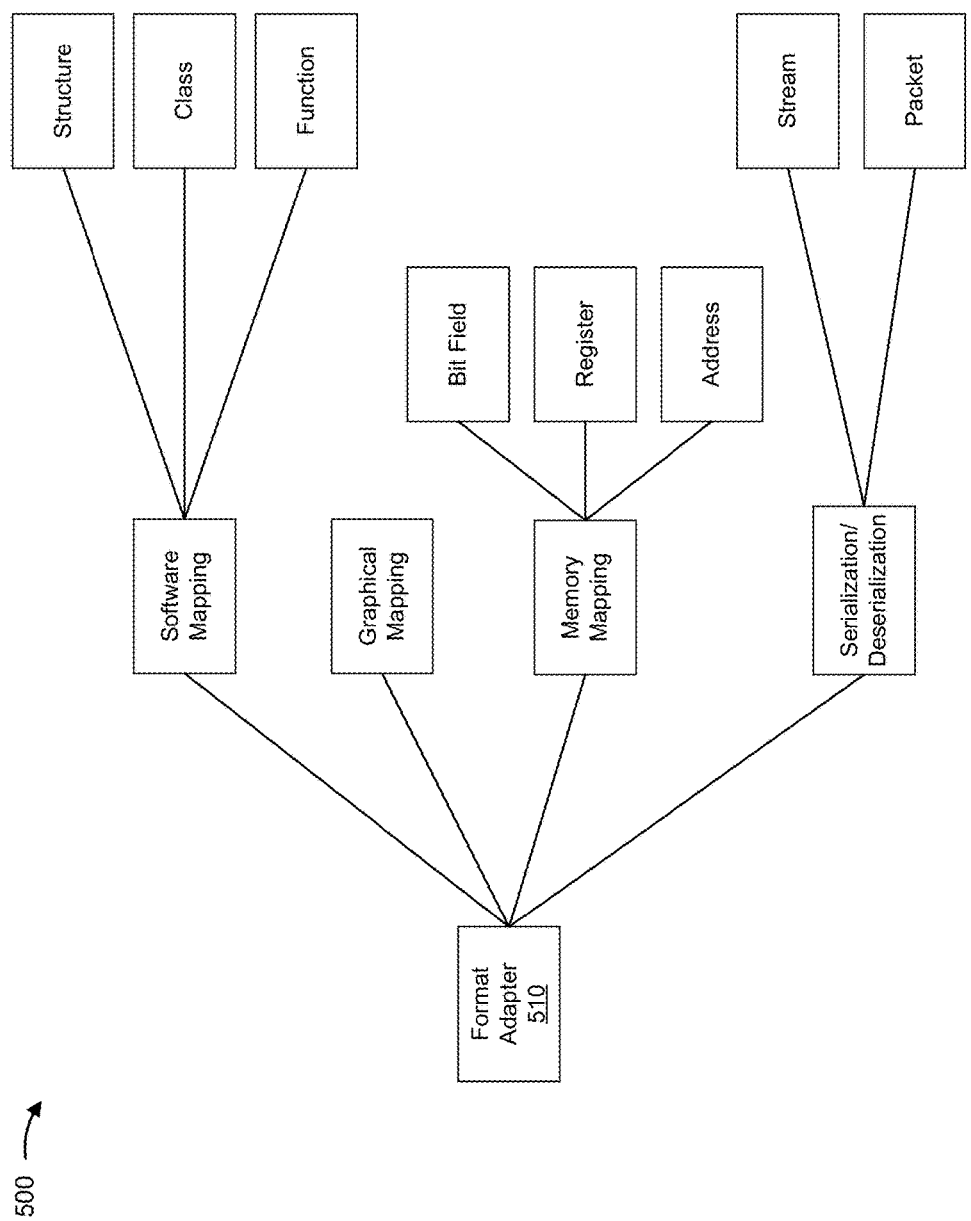

As shown in FIG. 5B, in some implementations, interface 505 may include format adapter 510 (e.g., an adapter that processes a signal based on a format of the signal). For example, and as shown, format adapter 510 may perform software mapping (e.g., may map a structure, class, function, etc. associated with the model to a second structure, class, function, etc. associated with external system 240), graphical mapping (e.g., may map a first element of a graphic interface associated with a model to a second element of a graphic interface associated with external system 240), memory mapping (e.g., may map a first bit field, register, address, etc. associated with a model to a second bit field, register, address, etc., associated with external system 240), serialization or deserialization (e.g., for a stream, a packet, etc.), or another type of format adaptation. In some implementations, format adapter 510 may be described by interface information associated with interface 505. In this way, interface 505 may facilitate interaction between sources and destinations that are configured to send and receive different formats of signals.

Figure 5C:
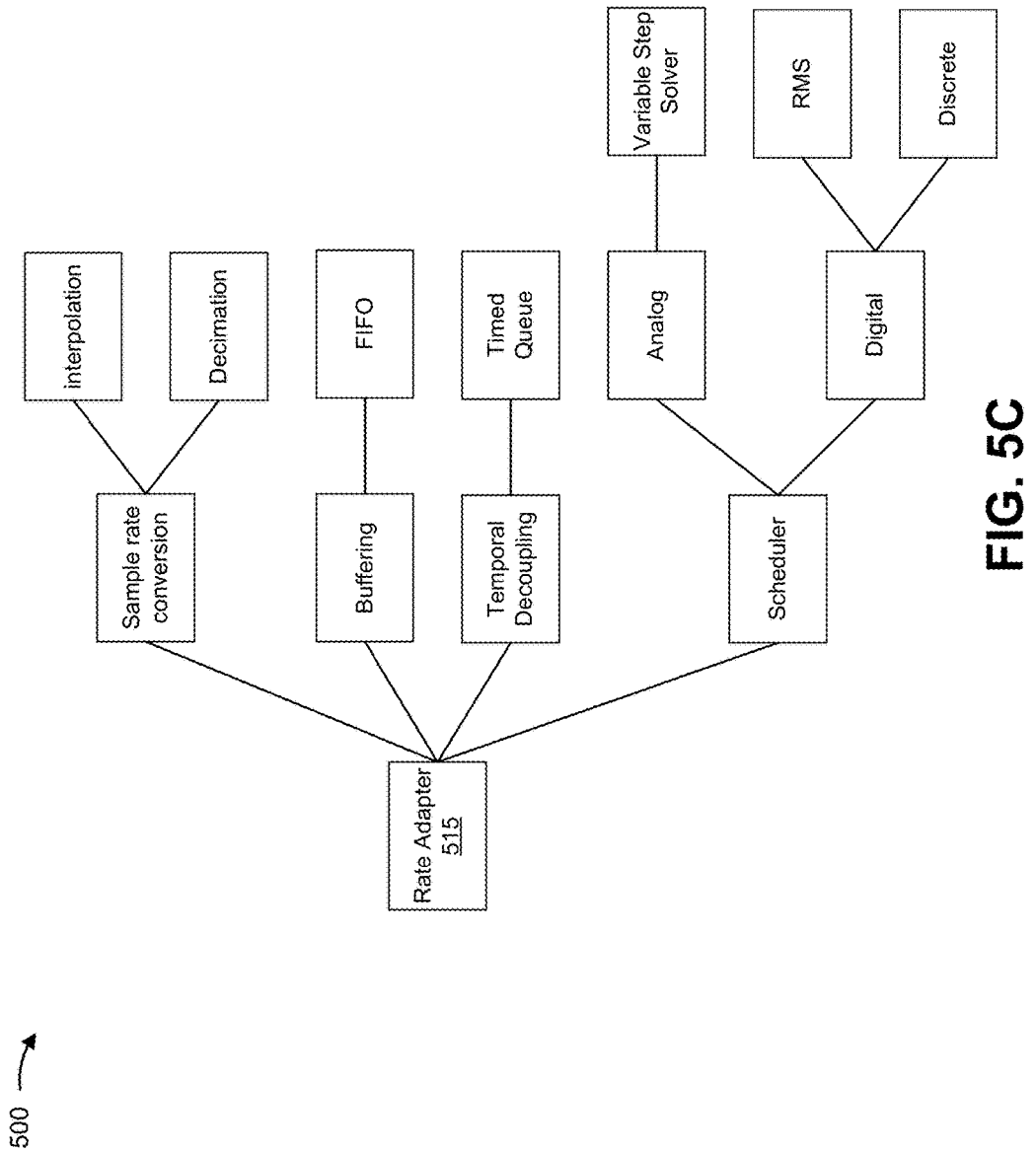

As shown in FIG. 5C, in some implementations, interface 505 may include rate adapter 515 (e.g., a data rate adapter, or an adapter that processes a signal based on a data transmission rate). For example, and as shown, rate adapter 515 may perform sample rate conversion (e.g., by performing sample interpolation, sample decimation, or the like), buffering (e.g., using a First-In First-Out (FIFO) queuing method, or the like), a temporal decoupling adaptation (e.g., using a timed queue, or the like), analog scheduling (e.g., a variable-step solver, or the like), digital scheduling (e.g., a rate monotonic scheduler, a discrete scheduler, or the like), and/or another similar type of operation. In some implementations, rate adapter 515 may be described by interface information associated with interface 505. In this way, interface 505 may facilitate communication between sources and destinations associated with different data transmission rates.

Figure 5D:
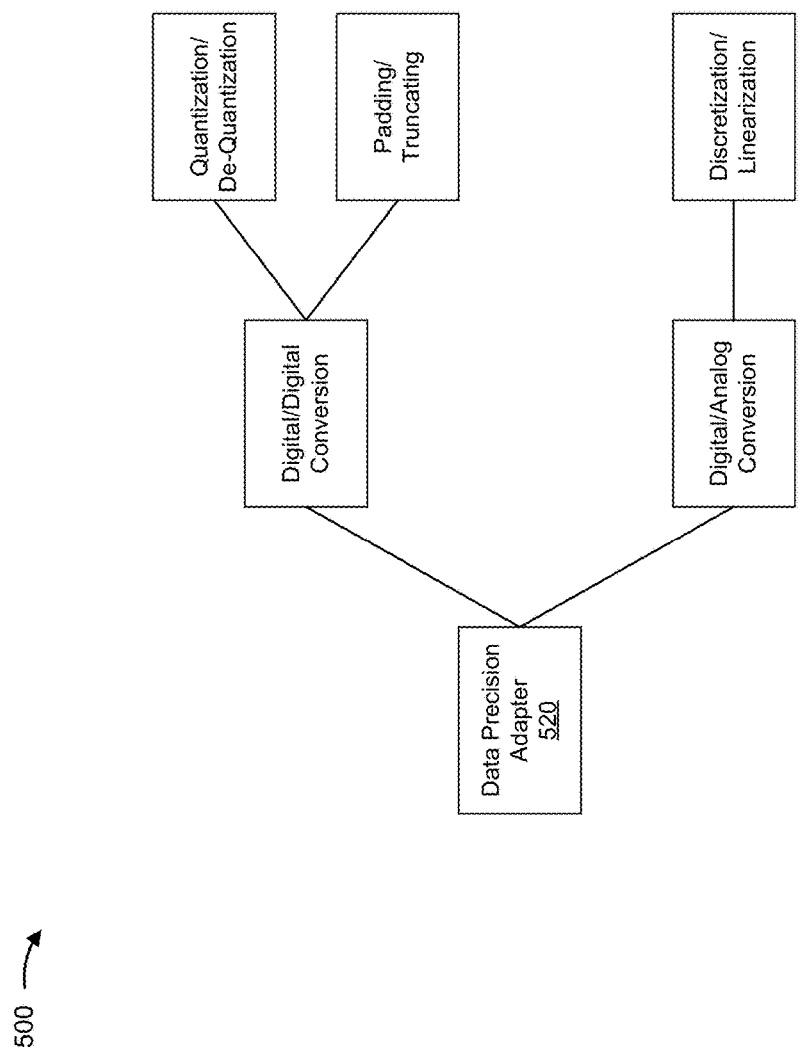

As shown in FIG. 5D, in some implementations, interface 505 may include data precision adapter 520 (e.g., an adapter that increases or decreases a number of bits that represent the information). In some implementations, and as shown, data precision adapter 520 may adapt a digital signal (e.g., by performing a quantization adaptation, a de-quantization adaptation, a padding adaptation, a truncating adaptation, or the like). Additionally, or alternatively, data precision adapter 520 may convert an analog signal into a digital signal, or may convert a digital signal into an analog signal. For example, the data precision adapter may perform a discretization to convert a continuous analog signal into a discrete digital signal and/or may perform a linearization to convert a discrete digital signal into a continuous analog signal. In some implementations, data precision adapter 520 may be described by interface information associated with interface 505. In this way, interface 505 may facilitate interaction between an analog source and a digital destination or between a digital source and an analog destination.

Figure 5E:
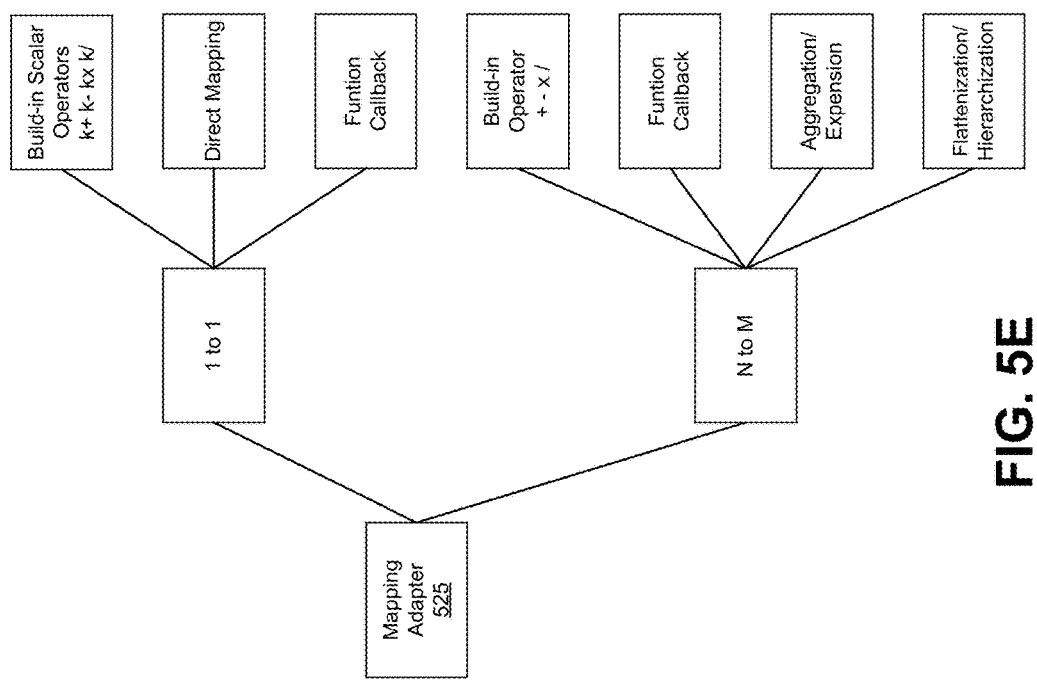

As shown in FIG. 5E, in some implementations, interface 505 may include mapping adapter 525 (e.g., an adapter that processes a signal based on a defined signal mapping between a source and a destination). For example, and as shown, mapping adapter 525 may be configured based on a user input (e.g., to provide information that describes a custom mapping), the model information, the external system information, or the like. In some implementations, mapping adapter 525 may perform a one to one adaption (e.g., may perform signal mapping of one particular input signal, address, register, port, etc. to one particular output signal, address, register, port, etc.). Additionally, or alternatively, mapping adapter 525 may perform an M to N adaptation (e.g., may perform signal mapping of a first set of input signals, addresses, registers, ports, etc. to a second set of output signals, addresses, registers, ports, etc.).

For example, based on interface information, mapping adapter 525 may map a signal from a first source to a pair of signals received at a first destination, may map more than one signal of a particular signal type from a second source to a single signal received at the second destination, or the like. In some implementations, mapping adapter 525 may support operations on the signals. For example, mapping adapter 525 may be configured to perform a scalar operation in connection with a signal, to perform an operation on a first signal based on a second signal (e.g., may multiply the first signal by the second signal, may add the first signal to the second signal, or the like), or the like. In some implementations, mapping adapter 525 may be described by interface information associated with interface 505. In this way, client device 210 may support custom mapping based on interface information, which may improve versatility of an interface and may allow a user to define custom mappings for interface 505.

As described above, FIGS. 5A-5E are provided as an example. Other examples are possible and may different from what was described in connection with FIGS. 5A-5E.

FIG. 6 is a flow chart of an example process 600 for generating interface code to facilitate interaction between a model and an external system. In some implementations, one or more process blocks of FIG. 6 may be performed by client device 210. In some implementations, one or more process blocks of FIG. 6 may be performed by another device or a set of devices separate from or including client device 210, such as server device 230 and/or external system 240.

As shown in FIG. 6, process 600 may include determining model information that describes a model (block 610). For example, client device 210 may determine model information. The model information may describe a model that is to interact with external system 240 via an interface. In some implementations, client device 210 may determine the model information automatically. For example, client device 210 may determine the model information based on detecting one or more inputs, one or more outputs, and/or information that describes the one or more inputs and/or one or more outputs.

In some implementations, client device 210 may receive the model information from an external source. For example, client device 210 may receive the model information from a user of client device 210 (e.g., based on the user providing the model information via a user interface, linking a file that contains the model information, modifying a file that contains the model information, or the like), from a network source (e.g., based on querying the network source for information associated with the model, or the like), from another device (e.g., server device 230, or the like), or from another external source.

A model may interact with external system 240. For example, the model may receive signals from and/or provide signals to external system 240. A signal may include information used by the model and/or external system 240, and may be associated with a particular data type (e.g., a floating point data type, an integer data type, a logical data type, a fixed point data type, a bus data type, a data structure data type, an object, a user-defined data type, a combination of two or more data types, etc.). In some implementations, the model may simulate a component of external system 240, such as a device, a process, a function, a block, a model, a model of a model, or the like, associated with external system 240. In that case, the model may be executed by external system 240. Additionally, or alternatively, the model may be executed by client device 210, and may interact with external system 240 based on the execution. In some implementations, the model may be implemented using source code. The model may provide and/or receive signals that are incompatible with the model or with external system 240.

In some implementations, the model information may include information related to one or more signals (e.g., as described above in connection with FIG. 4B). For example, the model information may identify the one or more signals as model inputs and/or model outputs and/or may identify a data type associated with the one or more signals. In some implementations, the model information may identify a data transmission rate associated with the one or more signals (e.g., a number of bits per second, a number of packets per second, or the like). In some implementations, the model information may identify a data precision associated with the one or more signals (e.g., a number of digits, bits, or the like, associated with a particular value of the one or more signals). Client device 210 may use the information related to the one or more signals to design an interface that facilitates interaction between the model and external system 240.

As further shown in FIG. 6, process 600 may include determining external system information that describes an external system (block 620). For example, client device 210 may determine external system information. In some implementations, client device 210 may determine the external system information based on an external source (e.g., by importing a file containing the external system information). In some implementations, client device 210 may determine the external system information automatically (e.g., by detecting the external system information, or the like). For example, client device 210 may determine the external system information based on detecting one or more external system inputs, one or more external system outputs, and/or information that describes the one or more external system inputs and/or one or more external system outputs. In some implementations, client device 210 may determine the external system information based on a user input (e.g., a user may provide the external system information, may link a file containing the external system information, or the like). In essence, the external system information may include any information (e.g., characteristics) relating to signals that are output from external system 240 to the model and/or received by external system 240 from the model. Client device 210 may use the external system information to generate interface code that facilitates interaction with the model.

In some implementations, the model may simulate a component of external system 240 (e.g., a behavior, function, etc. associated with and/or performed by external system 240). In this case, client device 210 (e.g., TCE 220) may receive information regarding the external system to allow the external system to be modeled (e.g., a file that includes a model of the external system, information regarding characteristics of the external system that permits TCE 220 to model the external system, etc.). Additionally, or alternatively, client device 210 (e.g., TCE 220) may verify and/or test a model of the external system.

The model may simulate the component in order to determine information related to external device 240. For example, assume that external system 240 includes a processor. Assume further that a model simulates a function of the processor. The model, when executed, may receive signals from and/or provide signals to external system 240 to simulate the function of the processor. For example, the model may receive an input originally provided toward the processor, may perform the function, and may provide an output to external system 240 based on performing the function. By generating a model performing the function typically performed by the processor, client device 210 may determine information related to external system 240 (e.g., a behavior associated with external system 240 and/or the processor, or the like).

In some implementations, the external system information may include information related to one or more signals (e.g., as described above in connection with FIG. 4C). For example, the external system information may identify the one or more signals as external system inputs and/or external system outputs and/or may identify a data type associated with the one or more signals. In some implementations, the external system information may identify a data transmission rate associated with the one or more signals (e.g., a number of bits per second, a number of packets per second, or the like). In some implementations, the external system information may identify a data precision associated with the one or more signals (e.g., a number of digits, bits, or the like, associated with a particular value of the one or more signals). Client device 210 may use the information related to the one or more signals to design an interface that facilitates interaction between the model and external system 240.

In some implementations, client device 210 may receive the external system information from an external source. For example, client device 210 may receive the external system information from a user of client device 210 (e.g., based on the user providing the external system information via a user interface, based on the user linking a file that contains the external system information, based on the user modifying a file that contains the external system information, or the like), from external system 240 (e.g., based on external system 240 providing the external system information, based on client device 210 requesting a file stored by external system 240 that includes the external system, or the like), from a network source (e.g., based on querying the network source for information associated with external system 240, or the like), from another device (e.g., server device 230, or the like), or from another external source.

As further shown in FIG. 6, process 600 may include determining interface information that describes an interface to facilitate interaction between the model and the external system (block 630). For example, client device 210 may receive interface information. The interface information may describe an interface between a model and external system 240. Client device 210 may use the interface information and/or other information to generate and/or provide an interface that facilitates interaction between the model and external system 240 (e.g., as described above in connection with FIGS. 4D and 4E). In some implementations, the interface information may describe the interface, the model, and/or the external system using a standard format, such as Extensible Markup Language (XML), IP-XACT, or the like.

An interface may be a program, a routine, source code, or the like, that facilitates interaction between the model and external system 240. For example, the interface may receive signals from the model, may cause client device 210 and/or external system 240 to process the signals, and may provide processed signals to external system 240. Additionally, or alternatively, the interface may receive signals from external system 240, may cause client device 210 and/or external system 240 to process the information, and may provide processed signals to the model. In some implementations, the interface may be stored and/or executed on a same device as the model (e.g., client device 210). Additionally, or alternatively, the interface may be stored and/or executed on a different device than the model (e.g., the model may be executed by client device 210, and the interface may be stored by and/or executed by a separate device that includes external system 240). In some implementations, the interface may be generated and/or provided based on a standard interface protocol (e.g., an Advanced Extensible Interface (AXI) protocol, a Direct Programming Interface (DPI) protocol (e.g., DPI-C), a Universal Verification Methodology (UVM) protocol, a transaction level modeling (TLM) protocol, or the like).

In some implementations, client device 210 may receive the interface information from an external source. For example, client device 210 may receive the interface information from a user of client device 210 (e.g., based on the user providing the interface information via a user interface, based on the user linking a file that contains the interface information, based on the user modifying a file that contains the interface information, or the like), from a network source (e.g., based on querying the network source for interface information, or the like), from external system 240 (e.g., based on external system 240 storing interface information, based on querying external system 240 for interface information, etc.), from another device (e.g., server device 230, or the like), or from another external source.

The interface information may include information that describes an adapter. An adapter may cause a device to adapt signals transmitted via an interface, in order to facilitate interaction between the model and external system 240. In some implementations, the interface information may describe multiple, different adapters, such as a format adapter, a data rate adapter, a data precision adapter, a mapping adapter, and/or another type of adapter, as described in above in connection with FIGS. 5A-5E.

In some implementations, the interface information may include information related to causing external system 240 to provide the interface. For example, the interface information may describe a type of external system 240 to provide the interface, a particular type of hardware code and/or software code to use to generate the interface code, a particular type of component on which the interface will be executed, or the like. Based on the interface information, client device 210 may provide the interface code to external system 240 for implementation, which may allow external system 240 to provide the interface. In this way, external system 240 may provide the interface when external system 240 is executing model code, which may improve performance when modeling a component of external system 240.

In some implementations, the interface information may include information related to a macro. A macro may define collections of inputs, outputs, data types, and/or operations that are to be performed on the inputs and outputs using variables that can be easily edited to modify the number of inputs, outputs, data/types, and/or operations. For example, a single macro line may be used, in conjunction with information used to expand the macro language (e.g., a defined sequence of characters to define operations to perform on multiple signals, a defined sequence of characters to indicate a quantity of the multiple signals for which to define the operations, etc.), to define interface operations for multiple signals, even when the operations performed on the signals are not identical. In this way, client device 210 may reduce an amount of coding required by a user of client device 210 by generating interface code based on macros.

As further shown in FIG. 6, process 600 may include generating interface code based on the model information, the external system information, and/or the interface information (block 640). For example, client device 210 may generate interface code based on the model information, the external system information, and/or the interface information (e.g., as described above in connection with FIG. 4D). The interface code may cause client device 210 and/or external system 240 to provide an interface to facilitate interaction between a model and external system 240. The interface code may be software code, hardware code, or a combination of software code and hardware code.

The interface code may include code that defines a name of the interface (e.g., a name specified in the interface design information), a type of the interface (e.g., a memory map interface, a software interface, a network stream interface, a fixed step solver interface, or another type of interface), a signal mapping of one or more model signals to one or more external system signals, information related to one or more adapters (e.g., one or more types of adapters, processes performed in association with the one or more types of adapters, parameters used by the one or more types of adapters and/or processes, etc.), or the like.

In some implementations, the interface code may be software code (e.g., C, C++, Java, Python, Perl, MATLAB code, tool command language (Tcl), etc.). For example, assume that external system 240 is to provide the interface. Assume further that external system 240 is capable of compiling and executing software code (e.g., external system 240 may be hosted by client device 210, may be associated with a computer that is capable of compiling and executing software code, or the like). In that case, client device 210 may provide software code to external system 240. In some implementations, client device 210 may compile the software code and provide compiled software code to external system 240. In other implementations, external system 240 may compile and execute the software code. In this way, client device 210 may provide software code to external system 240 for providing the interface, which may enable an external system 240 that is capable of executing software code to provide the interface.

In some implementations, the interface code may be hardware code (e.g., Very High Speed Integrated Circuit (VHSIC) Hardware Description Language (VHDL), Verilog, SystemVerilog, etc.). For example, assume that external system 240 is to provide the interface. Assume further that external system 240 is capable of executing hardware code. In that case, client device 210 may generate hardware code based on the external system information and/or the interface information. For example, the external system information and/or the interface information may specify that hardware code is to be generated for the interface for external system 240. Based on the external system information and/or the interface information, client device 210 may generate the interface code using hardware code. In this way, client device 210 may enable external system 240 to provide the interface based on hardware code, which may improve performance of client device 210, and may enable an external system 240 that is capable of executing hardware code to provide the interface.

In some implementations, client device 210 may dynamically generate interface code. For example, assume that client device 210 provides an interface, and stores, locally, interface code for providing the interface. Assume further that client device 210 receives a modification to the interface code and/or interface information used to generate the interface code. For example, a user of client device 210 may modify an input, an output, mapping information, an adapter, or the like. Based on the modification, client device 210 may generate updated interface code. Client device 210 may provide an updated interface based on the updated interface code. In this way, client device 210 may support dynamic generation of interface code, which may cause an interface to be automatically updated based on changes to a model with which the interface is associated.

In some implementations, client device 210 may generate model code. For example, client device 210 may generate model code based on the model information. The model code, when executed, may simulate a system modeled by the model. In some implementations, client device 210 may execute the model code locally, and may receive and/or provide a signal to external system 240 based on executing the model code locally. Additionally, or alternatively, client device 210 may provide a part of the model code to external system 240, and may cause external system 240 to execute the part of the model code to simulate a component of external system 240. In some implementations, client device 210 may generate the model code based on information associated with the component of external system 240, such as one or more operating characteristics of the component, a relationship between the component and other components of external system 240, or the like.

As further shown in FIG. 6, process 600 may include providing and/or causing execution of the interface code (block 650). For example, after generating the interface code, client device 210 may provide and/or cause execution of the interface code. In some implementations, client device 210 may compile the interface code before causing execution of the interface code. Additionally, or alternatively, client device 210 may provide the interface code to another device for compiling and/or execution, such as external system 240.

Execution of the interface code may cause a first signal, compatible with the model but incompatible with external system 240, to be transformed to a second signal compatible with external system 240 but incompatible with the model. Additionally, or alternatively, execution of the interface code may cause the second signal to be transformed to the first signal. As described elsewhere herein, the transformation may include a data precision transformation, a data rate transformation, a data format transformation, a mapping transformation, or the like.

As an example, a model output signal, output from the model, may be transformed to an external system input signal, and may be input to the external system. Additionally, or alternatively, an external system output signal, output from the external system, may be transformed to a model input signal, and may be input to the model. In some implementations, the external system input signal may be used (e.g., by external system 240) to generate the external system output signal. Thus, the interface code, when executed, may permit the model and external system 240 to communicate using signals that would otherwise be incompatible with the model and/or external system 240.

In some implementations, client device 210 may generate a representation of external system 240, and may include the representation in the model. In some implementations, the representation may be an executable representation that is executable by client device 210 to simulate behavior of external system 240. Client device 240 may execute the model (e.g., using model code), the executable representation of external system 240, and the interface code. When executed, the interface code may permit the model and the executable representation of external system 240 to communicate using signals that would otherwise be incompatible with the model and/or the executable representation of external system 240.

In this way, client device 210 may efficiently generate and/or provide interface code that, when executed, causes a device to provide an interface to facilitate interaction between a model and external system 240. Client device 210 may generate the interface code based on model information, external system information, and/or interface information, which may improve efficiency of generating the interface by reducing an amount of coding performed by a user of client device 210. In some implementations, the interface code may be provided to and executed by external device 240, which may allow external device 240 to provide an interface when executing model code that simulates a component of external device 240.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) is to be broadly interpreted to include text-based code that may not require further processing to execute (e.g., C++ code, Hardware Description Language (HDL) code, very high speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like. In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
one or more instructions that, when executed by one or more processors, cause the one or more processors to:
receive model information that describes a model and external system information that describes an external system that is different than the model,
the model information identifying a first set of signals, associated with the model, that are incompatible with the external system, and
the external system information identifying a second set of signals, associated with the external system, that are incompatible with the model;
generate interface code based on the model information and the external system information,
the interface code, when executed, permitting the model and the external system to interact using the first set of signals and the second set of signals; and
execute the interface code to transform:
the first set of signals, compatible with the model, to the second set of signals compatible with the external system, and
the second set of signals, compatible with the external system, to the first set of signals compatible with the model.

2. The computer-readable medium of claim 1, where the one or more instructions, when executed by the one or more processors, further cause the one or more processors to:
receive the second set of signals from the external system;
where the one or more instructions, that cause the one or more processors to execute the interface code, cause the one or more processors to:
transform the second set of signals to the first set of signals; and
where the one or more instructions, when executed by the one or more processors, further cause the one or more processors to:
provide the first set of signals as input to the model.

3. The computer-readable medium of claim 1, where the first set of signals includes:
a model input signal to be input to the model, and
a model output signal to be output from the model;
where the second set of signals includes:
an external system input signal to be input to the external system, and
an external system output signal to be output from the external system; and
where the one or more instructions, when executed by the one or more processors, further cause the one or more processors to:
receive the model output signal from the model;
where the one or more instructions, that cause the one or more processors to execute the interface code, cause the one or more processors to:
transform the model output signal to the external system input signal;
where the one or more instructions, when executed by the one or more processors, further cause the one or more processors to:
provide the external system input signal to the external system; and
receive the external system output signal from the external system;
where the one or more instructions, that cause the one or more processors to execute the interface code, cause the one or more processors to:
transform the external system output signal to the model input signal; and
where the one or more instructions, when executed by the one or more processors, further cause the one or more processors to:
provide the model input signal to the model.

4. The computer-readable medium of claim 1, where the one or more instructions, when executed by the one or more processors, further cause the one or more processors to:

determine interface information based on the model information and the external system information,
the model information describing the first set of signals, the external system information describing the second set of signals, and the interface information being determined without user input; and
where the one or more instructions, that cause the one or more processors to generate the interface code, cause the one or more processors to:
generate the interface code based on the interface information.

5. The computer-readable medium of claim 1, where the one or more instructions, that cause the one or more processors to generate the interface code, further cause the one or more processors to:
generate the interface code for interfacing with a hardware system,
wherein the external system includes the hardware system.

6. The computer-readable medium of claim 1, where the one or more instructions, that cause the one or more processors to generate the interface code, cause the one or more processors to:
generate the interface code for interfacing with a software system,
wherein the external system includes the software system.

7. The computer-readable medium of claim 1, where the one or more instructions, when executed by the one or more processors, further cause the one or more processors to:
receive interface information describing an adapter,
the adapter, when executed, processing the first set of signals or the second set of signals, and
the adapter including at least one of:
a data precision adapter to process a first signal, of the first set of signals, or a second signal, of the second set of signals, based on a data precision,
a data rate adapter to process a third signal, of the first set of signals, or a fourth signal, of the second set of signals, based on a data transmission rate,
a format adapter to process a fifth signal, of the first set of signals, or a sixth signal, of the second set of signals, based on a data format, or
a mapping adapter to process a seventh signal, of the first set of signals, or an eighth signal, of the second set of signals, based on a defined mapping.

8. The computer-readable medium of claim 7, where the format adapter performs a graphical mapping of a first element of a graphical interface, associated with the model, to a second element of a graphical interface associated with the external system.

9. The computer-readable medium of claim 7, where the rate adapter performs at least one of:
a digital-to-analog mapping of at least one signal, of the first set of signals, to at least one other signal, of the second set of signals, or
an analog-to-digital mapping of the at one least signal, of the first set of signals, to the at least one other signal, of the second set of signals.

10. A method, comprising:
receiving interface code that, when executed, permits a model and an external system to communicate using a first set of signals and a second set of signals,
the first set of signals being compatible with the model,
the first set of signals being incompatible with the external system when the interface code is unavailable,
the second set of signals being compatible with the external system, and the second set of signals being incompatible with the model when the interface code is unavailable;
the receiving being performed by a device;
executing the interface code to permit the model and the external system to communicate,
the executing making the interface code available, and
the executing being performed by the device; and
transforming, based on executing the interface code, at least one of:
the first set of signals to the second set of signals, or
the second set of signals to the first set of signals,
the transforming being performed by the device.

11. The method of claim 10, where the device includes the external system.

12. The method of claim 10, where the external system includes a hardware system, and
where the interface code permits the model to interact with the hardware system.

13. The method of claim 10, where the external system includes a software system, and
where the interface code permits the model to interact with the software system.

14. The method of claim 10, where transforming the first set of signals to the second set of signals or transforming the second set of signals to the first set of signals comprises:
transforming a first data precision, of a first signal, to a second data precision of a second signal,
transforming a first data rate, of the first signal, to a second data rate of the second signal, or
transforming a first format, of the first signal, to a second format of the second signal.

15. The method of claim 10, where the interface code is based on a standard interface protocol,
the standard interface protocol including at least one of:
an Advanced Extensible Interface (AXI) protocol,
a Direct Programming Interface (DPI) protocol,
a Universal Verification Methodology (UVM) protocol, or
a transaction level modeling (TLM) protocol.

16. The method of claim 10, where receiving the interface code comprises:
receiving information that describes an adapter,
the adapter, when executed, processing the first set of signals or the second set of signals,
the adapter including at least one of:
a data precision adapter to process the first set of signals or the second set of signals from a first data precision to a second data precision,
a data rate adapter to process the first set of signals or the second set of signals from a first data transmission rate to a second data transmission rate,
a format adapter to process the first set of signals or the second set of signals from a first data format to a second data format, or
a mapping adapter to process the first set of signals or the second set of signals based on a defined mapping.

17. A device, comprising:
one or more processors to:
receive external system information that describes a first set of signals, output by an external system, that are incompatible with a model associated with the external system;

receive model information that describes a second set of signals, output by the model, that are incompatible with the external system;
generate interface code based on the model information and the external system information,
  the interface code, when executed, permitting the model and an executable representation of the external system to communicate using the first set of signals and the second set of signals;
include the executable representation of the external system in the model;
execute the model and the executable representation of the external system;
execute the interface code to permit the model and the executable representation of the external system to communicate using the first set of signals and the second set of signals; and
transform, based on executing the interface code, at least one of:
  the first set of signals to the second set of signals, or
  the second set of signals to the first set of signals.

18. The device of claim 17, where the one or more processors are further to:
receive interface information,
  the interface information describing a mapping,
  the mapping describing a relationship between one or more of the first set of signals and one or more of the second set of signals; and
where the one or more processors, when generating the interface code, are to:
  generate the interface code based on the mapping,
  the interface code, when executed, processing the one or more of the first set of signals and the one or more of the second set of signals based on the relationship.

19. The device of claim 17, where the one or more processors are further to:
receive interface information describing an adapter,
  the adapter, when executed, processing the first set of signals and the second set of signals, and
  the adapter including at least one of:
    a data precision adapter to process a first signal, of the first set of signals, and a second signal, of the second set of signals, based on a data precision,
    a data rate adapter to process a third signal, of the first set of signals, and a fourth signal, of the second set of signals, based on a data transmission rate,
    a format adapter to process a fifth signal, of the first set of signals, and a sixth signal, of the second set of signals, based on a data format, or
    a mapping adapter to process a seventh signal, of the first set of signals, and an eighth signal, of the second set of signals, based on a defined mapping.

20. The device of claim 17, where the one or more processors are further to:
generate the interface code based on interface information that describes the interface,
  the interface information being described using:
    Extensible Markup Language (XML), or
    IP-XACT.

* * * * *